United States Patent
Curtis et al.

(10) Patent No.: US 10,357,720 B2
(45) Date of Patent: *Jul. 23, 2019

(54) SYSTEM AND METHOD FOR PROVIDING IN-GAME TIMED OFFERS

(71) Applicant: Kabam, Inc., San Francisco, CA (US)

(72) Inventors: Matthew Curtis, Novato, CA (US); Kellen Christopher Smalley, Pleasanton, CA (US); Christopher Pitz, San Francisco, CA (US); Michael C. Caldarone, Palo Alto, CA (US)

(73) Assignee: Kabam, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/916,076

(22) Filed: Mar. 8, 2018

(65) Prior Publication Data

US 2018/0193756 A1 Jul. 12, 2018

Related U.S. Application Data

(63) Continuation of application No. 14/485,135, filed on Sep. 12, 2014, now Pat. No. 9,975,052, which is a
(Continued)

(51) Int. Cl.
*A63F 13/00* (2014.01)
*A63F 13/85* (2014.01)
(Continued)

(52) U.S. Cl.
CPC .............. *A63F 13/85* (2014.09); *A63F 13/30* (2014.09); *A63F 13/61* (2014.09);
(Continued)

(58) Field of Classification Search
CPC .......... A63F 13/30; A63F 13/44; A63F 13/61; A63F 13/822; A63F 13/85; A63F 2300/5506; A63F 2300/609; G06Q 30/0209; G06Q 30/0241; G06Q 50/01; G06Q 20/123; G06Q 20/387; G06Q 30/00; G06Q 30/0207; G06Q 30/0224;
(Continued)

(56) References Cited

U.S. PATENT DOCUMENTS 5,933,813 A 8/1999 Teicher
5,964,660 A 10/1999 James
(Continued)

OTHER PUBLICATIONS

"Behavioural Analytics & Campaigning", http://lotaris.com/behavioural._analytics_and._Campaigning.htm, screenshot access date May 24, 2012 2:21 PM, 1 page.
(Continued)

*Primary Examiner* — Justin L Myhr
(74) *Attorney, Agent, or Firm* — Esplin & Associates, PC

(57) ABSTRACT

A system and method are disclosed for providing an in-game offer to one or more players of an online game. The offer is provided to players that have newly joined the game and/or to players that have not yet made a purchase. In some implementations, the offer may be meant to incentivize purchase upon entry into the game. The in-game offer may comprise an offer to one or more items and a bonus comprising one or more bonus items provided to the player responsive to the offered items being purchased. The in-game offer may only be made available to a qualifying player for a certain amount of time.

22 Claims, 4 Drawing Sheets

Related U.S. Application Data continuation of application No. 13/733,017, filed on Jan. 2, 2013, now Pat. No. 8,920,243.

(51) Int. Cl.
<table>
<tr><td>A63F 13/61</td><td>(2014.01)</td></tr>
<tr><td>A63F 13/30</td><td>(2014.01)</td></tr>
<tr><td>G06Q 30/02</td><td>(2012.01)</td></tr>
<tr><td>A63F 13/44</td><td>(2014.01)</td></tr>
<tr><td>A63F 13/822</td><td>(2014.01)</td></tr>
</table>

(52) U.S. Cl.
CPC ..... *G06Q 30/0209* (2013.01); *G06Q 30/0241* (2013.01); *A63F 13/44* (2014.09); *A63F 13/822* (2014.09)

(58) Field of Classification Search
CPC ........... G06Q 30/0251; G06Q 30/0269; G06Q 30/0277; G06Q 30/02; G06Q 30/0601; G06Q 30/0641; G07F 17/3255; G07F 17/3244; G07F 17/32; G06N 3/006
See application file for complete search history.

(56) References Cited

U.S. PATENT DOCUMENTS

| | | |
|---|---|---|
| 6,850,900 B1 | 2/2005 | Hare |
| 6,928,474 B2 | 8/2005 | Venkatesan |
| 7,076,453 B2 | 7/2006 | Jammes |
| 7,533,336 B2 | 5/2009 | Jaffe |
| 7,660,740 B2 | 2/2010 | Boone |
| 7,682,239 B2 | 3/2010 | Friedman |
| 8,016,668 B2 | 9/2011 | Hardy |
| 8,050,976 B2 | 11/2011 | Staib |
| 8,157,635 B2 | 4/2012 | Hardy |
| 8,187,101 B2 | 5/2012 | Herrmann |
| 8,221,223 B2 | 7/2012 | Walker |
| 8,226,472 B2 | 7/2012 | Van Luchene |
| 8,272,956 B2 | 9/2012 | Kelly |
| 8,282,491 B2 | 10/2012 | Auterio |
| 8,287,383 B1 | 10/2012 | Etter |
| 8,287,384 B2 | 10/2012 | Auterio |
| 8,292,743 B1 | 10/2012 | Etter |
| 8,332,260 B1 | 12/2012 | Mysen |
| 8,348,767 B2 | 1/2013 | Mahajan |
| 8,360,858 B2 | 1/2013 | LaRocca |
| 8,360,867 B2 | 1/2013 | VanLuchene |
| 8,366,544 B2 | 2/2013 | Walker |
| 8,401,913 B2 | 3/2013 | Alivandi |
| 8,777,754 B1 | 7/2014 | Santini |
| 8,920,243 B1 | 12/2014 | Curtis |
| 9,138,639 B1 | 9/2015 | Ernst |
| 9,345,974 B1 | 5/2016 | Santini |
| 2002/0059397 A1 | 5/2002 | Feola |
| 2002/0095327 A1 | 7/2002 | Zumel |
| 2003/0032476 A1 | 2/2003 | Walker |
| 2003/0102625 A1 | 6/2003 | Katz |
| 2004/0068451 A1 | 4/2004 | Lenk |
| 2004/0215524 A1 | 10/2004 | Parkyn |
| 2004/0267611 A1 | 12/2004 | Hoerenz |
| 2005/0114223 A1 | 5/2005 | Schneider |
| 2005/0165686 A1 | 7/2005 | Zack |
| 2006/0200370 A1 | 9/2006 | Ratliff |
| 2008/0032787 A1 | 2/2008 | Low |
| 2008/0154798 A1 | 6/2008 | Valz |
| 2008/0234043 A1 | 9/2008 | McCaskey |
| 2008/0275786 A1 | 11/2008 | Gluck |
| 2009/0011812 A1 | 1/2009 | Katz |
| 2009/0017886 A1 | 1/2009 | McGucken |
| 2009/0204907 A1 | 8/2009 | Finn |
| 2009/0210301 A1 | 8/2009 | Porter |
| 2009/0234710 A1 | 9/2009 | Belgaied Hassine |
| 2009/0247282 A1 | 10/2009 | Cheng |
| 2010/0035689 A1 | 2/2010 | Altshuler |
| 2010/0050088 A1 | 2/2010 | Neustaedter |
| 2010/0094841 A1 | 4/2010 | Bardwil |
| 2010/0174593 A1 | 7/2010 | Cao |
| 2010/0198653 A1 | 8/2010 | Bromenshenkel |
| 2010/0228606 A1 | 9/2010 | Walker |
| 2010/0241491 A1 | 9/2010 | Eglen |
| 2010/0241492 A1 | 9/2010 | Eglen |
| 2011/0092273 A1 | 4/2011 | Cerbini |
| 2011/0113353 A1 | 5/2011 | Koh |
| 2011/0145040 A1 | 6/2011 | Zahn |
| 2011/0300923 A1 | 12/2011 | VanLuchene |
| 2012/0011002 A1 | 1/2012 | Crowe |
| 2012/0040743 A1 | 2/2012 | Auterio |
| 2012/0040761 A1 | 2/2012 | Auterio |
| 2012/0042282 A1 | 2/2012 | Wong |
| 2012/0047002 A1 | 2/2012 | Patel |
| 2012/0059730 A1 | 3/2012 | Jensen |
| 2012/0101886 A1 | 4/2012 | Subramanian |
| 2012/0109785 A1 | 5/2012 | Karlsson |
| 2012/0130856 A1 | 5/2012 | Petri |
| 2012/0142429 A1 | 6/2012 | Muller |
| 2012/0166380 A1 | 6/2012 | Sridharan |
| 2012/0178529 A1 | 7/2012 | Collard |
| 2012/0197874 A1 | 8/2012 | Zatkin |
| 2012/0203669 A1 | 8/2012 | Borsch |
| 2012/0215667 A1 | 8/2012 | Ganz |
| 2012/0221430 A1 | 8/2012 | Naghmouchi |
| 2012/0231891 A1 | 9/2012 | Watkins |
| 2012/0245988 A1 | 9/2012 | Pace |
| 2012/0289315 A1 | 11/2012 | Van Luchene |
| 2012/0289330 A1 | 11/2012 | Leydon |
| 2012/0289346 A1 | 11/2012 | VanLuchene |
| 2012/0295699 A1 | 11/2012 | Reiche |
| 2012/0296716 A1 | 11/2012 | Barbeau |
| 2012/0309504 A1 | 12/2012 | Isozaki |
| 2012/0330785 A1 | 12/2012 | Hamick |
| 2013/0005466 A1 | 1/2013 | Mahajan |
| 2013/0006736 A1 | 1/2013 | Bethke |
| 2013/0012304 A1 | 1/2013 | Cartwright |
| 2013/0013459 A1 | 1/2013 | Kerr |
| 2013/0090173 A1 | 4/2013 | Kislyi |
| 2013/0124361 A1 | 5/2013 | Bryson |
| 2013/0226733 A1 | 8/2013 | Evans |
| 2014/0033262 A1 | 1/2014 | Anders |
| 2014/0067526 A1 | 3/2014 | Raju |
| 2014/0067544 A1 | 3/2014 | Klish |
| 2014/0073420 A1 | 3/2014 | Matthew |
| 2014/0087882 A1 | 3/2014 | Matsumoto |
| 2014/0089048 A1 | 3/2014 | Bruich |
| 2014/0100020 A1 | 4/2014 | Carroll |
| 2014/0157314 A1 | 6/2014 | Roberts |
| 2014/0243072 A1 | 8/2014 | Santini |
| 2014/0337259 A1 | 11/2014 | Lamb |
| 2015/0019349 A1 | 1/2015 | Milley |
| 2015/0031442 A1 | 1/2015 | Colvin |

OTHER PUBLICATIONS

"Building Structures". War2.warcraft.org. Online. Accessed via the Internet. Accessed Aug. 9, 2014. <URL: http://war2.warcraft.org/strategy/verybasics/building.shtml>, 3 pages.

"Clash of Clans". Wikipedia.org. Online. Accessed via the Internet. Accessed Aug. 9, 2014. <URL: http://en.wikipedia.org/wiki/Clash of Clans>, 3 pages.

"Digital River World Payments and Lotaris Partner to Extend Mobile Application Licensing and Monetization Capabilities to Software Publishers", Business Wire Press Release, http://www.marketwatch.com/story/digital-river-world-payments-and-lotaris . . . , posted San Francisco, Mar. 27, 2012 (Business Wire), 8:30 a.m. EDT, printed May 24, 2012 2:32 PM, 3 pages.

"Digital River World Payments and Lotaris Partner to Extend Mobile Application Licensing and Monetization Capabilities to Software Publishers", Lotaris Press Release, http://www.lotaris.com/digital_river_world_payments_and_lotaris_partne . . . , posted Tuesday, Mar. 27, 2012, screenshop access date May 24, 2012, 2:19 PM, 1 page.

"Gem calculation formulas", forum.supercell.net. Online. Accessed via the Internet. Accessed Aug. 9, 2014. <URL: http://forum.supercell.net/showthread.php/23028-Gem-calculation-formulas>, 3 pages.

(56) References Cited

OTHER PUBLICATIONS

"How Town Hall to Level 4". Forum.supercell.net. Online. Jan. 31, 2013. Accessed via the Internet. Accessed Feb. 21, 2015. URL:http://forum.supercell.net/showthread.php/15052-How-Town-Hall-to-Level-4, 2 pages.

"I don't have enough resources/builders to upgrade anything in my village, what can I do?" gamesupport.supercell.net. Online. Accessed via the Internet. Accessed Aug. 9, 2014. <URL: https://gamesupport.supercell.net/hc/en-us/articles/421482-I-don-t-have-enough-resources-builders-to-upgrade-anything-in-my-village-what-can-I-do->, Apr. 23, 2014, 9 pages.

"Lotro-Wiki.com" (evidence in regards to "Lord of the Rings Oline" MMORPG game), latest Dec. 22, 2011, http://lotro-wiki.com/index.php/Main_Page) (hereinafter referred to as Lotro>, http://lotro-wiki.com/index.php?title=LOTRO_Store&oldid=396550,http://lotro-wiki.com/index.php?title=Quest:A_Little_Extra_Never_Hurts_--_Part_1&oldid=399597, http://lotro-wiki.com/index.php?title=Quest:A_Little_Extra_Never_Hurts_--_Part_2&oldid=399366, http://lotro-wiki.com/index.php?title=Getting_Started&oldid=349681, Links are to used articles, 33 pages.

"Warcraft II: Tides of Darkness". Wikipedia.org. Online. Accessed via the Internet. Accessed Aug. 9, 2014. <URL: http://en.wikipedia.org/wiki/Warcraft_II:_Tides_of_Darkness>, 10 pages.

City Coins. CityVille Wikia. Online. Accessed via the Internet. Accessed Aug. 9, 2014. <URL: http://cityville.wikia.com/wiki/City_Coins>, 2 pages.

FriskyMongoose "Happy Island Updates", available Jun. 12, 2012 from https://web.archive.org/web/20120612004417/http://friskymongoose.com/happy-island-updates-new-attractions-decorations-and-limited-edition-item-bundles/, 7 pages.

Gaia "Black Friday Bundle" available on Nov. 23, 2011, from http://www.gaiaonline.com/forum/community-announcements/black-friday-big-bundles-rare-items/t.76127933/, 5 pages.

MMO Site "Rose Online Launches the Newest in Game Feature"; available Aug. 11, 2011 from https://web.archive.org/web/20110811231226/http://news.mmosite.com/content/2011-06-21/rose_online_launches_the_newest_in_game_feature.1.shtml, 3 pages.

TFWiki "teamfortress wiki" available Nov. 5, 2011 retrieved from https://web.archive.org/web/20111105044256/http://wiki.teamfortress.com/wiki/Loadout, 4 pages.

UBC, "Theory of Auctions" available on Mar. 24, 2012 from https://web.archive.org/web/20120324204610/http://montoya.econ.ubc.ca/Econ522/auctions.pdf, slide 5, Para. 1.3, 19 pages.

Wiki "Gaia online", available on Sep. 9, 2011, https://web.archive.org/web/20110927210155/http://en.wikipedia.org/wiki/Gaia_Online, 8 pages.

Hamari, Juho, "Game Design as Marketing: How Game Mechanics Create Demand for Virtual Goods", available on vol. 5, Issue 1, 2010, retrieved from Int. Journal of Business Science and Applied Management—http://www.business-and-management.org/library/2010/5_1--14-29-Hamari,Lehdonvirta.pdf, on May 26, 2015, 16 pages.

Ozeagle, "What happens if . . . answers about account types" on Lotro forum, Jan. 18, 2011,<https://www.lotro.com/forums/showthread.php?377885-What-happens-if-answers-about-the-account-types> (16 pgs).

<http://lotro-wiki.com/index.php?title=Ouest:A_Little_Extra_Never_Hurts_--_Part_2&oldid=399366>, <http://lotrowiki.com/index.php?title=Getting_Started&oldid=349681 >. Links are to used articles. (7 pgs) Feb. 26, 2014.

"Lotro-Wiki.com" (evidence in regards to "Lord of the Rings Oline" MMORPG game), latest Dec. 22, 2011, <http://lotrowiki.com/index.php/Main_Page), http://lotro-wiki.com/index.php?title=LOTRO_Store&oldid=396550, http://lotro-wiki.com/index.php?title=Quest:A_Little_Extra_Never_Hurts_--_Part_1&oldid=399597, http://lotro-wiki.com/index.php?title=Quest:A_Little_Extra_Never_Hurts_--_Part_2&oldid=399366, http://lotro-wiki.com/index.php?title=Getting_Started&oldid=349681, Links are to used articles, 33 pages.

Aeria Games GmbH, "First Time Buyer—August", Aug. 10, 2010, <http://grandfantasia.aeriagames.com/news/5600/first-time-buyeraugust> (2 pgs).

Lotro-Wiki.com, "Hunting Lodge (Archet)" with "Introduction Quest", Aug. 14, 2012, https://lotrouwiki.com/index.php?title=Hunting_Lodge_(Archet)&oldid=495361 and <https://lotrowiki.com/index. php?title= Introduction_ Quests&oldid=358308> (6 pages).

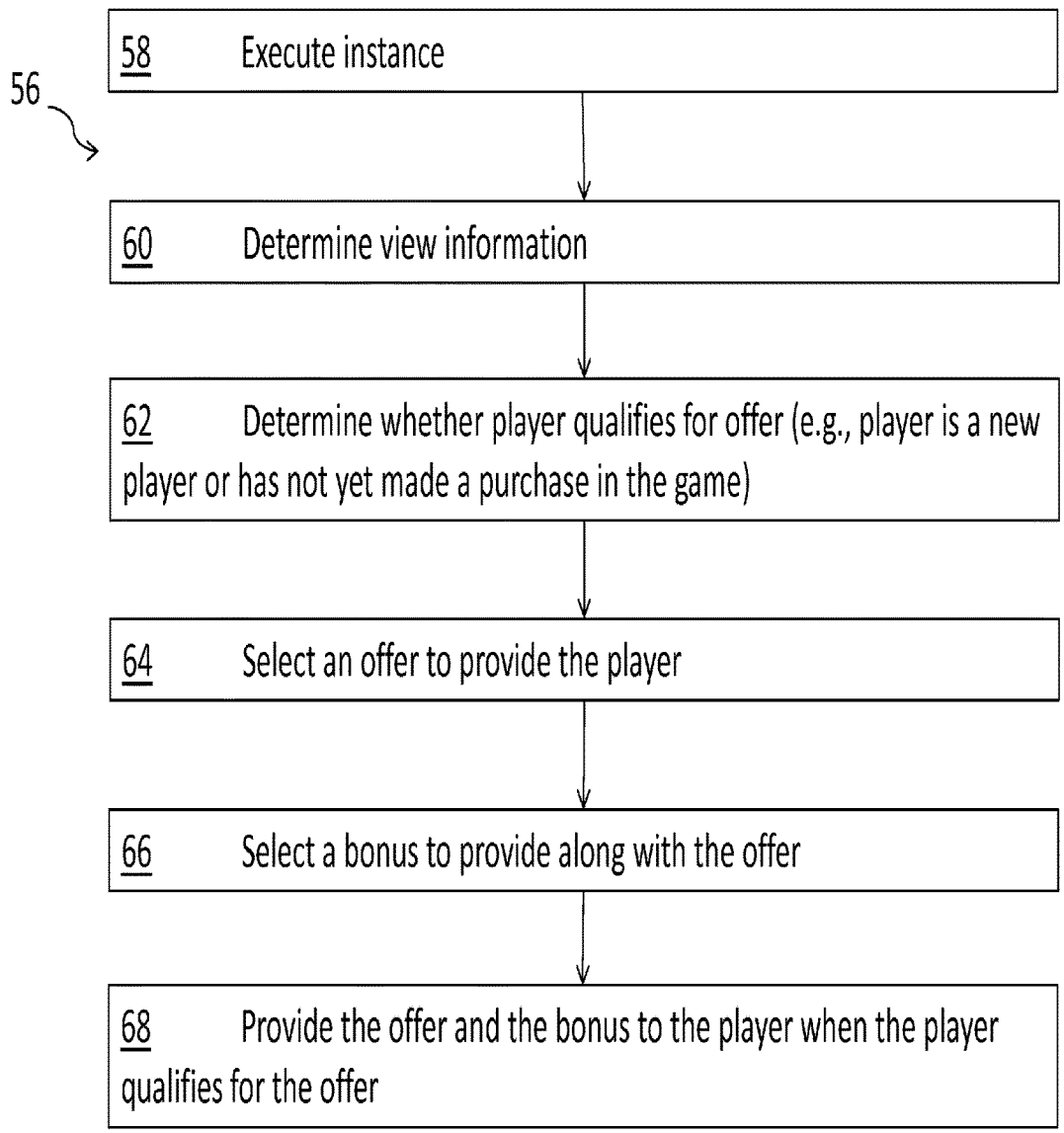

SYSTEM AND METHOD FOR PROVIDING IN-GAME TIMED OFFERS

CROSS REFERENCE TO RELATED APPLICATIONS

The present application is a continuation of U.S. patent application Ser. No. 13/733,017, filed Jan. 2, 2013, entitled "System and Method for Providing In-Game Timed Offers", the disclosure of which is incorporated herein by reference in its entirety.

FIELD

The disclosure relates to providing an in-game offer to a new player of the game when the new player joins a world in the game.

BACKGROUND

Various techniques for providing offers to players of an online game are known. For example, the provision of progressive offers to a player of an online game is known. Further, the provision of an offer based on a status of a player playing the game or based on a trigger in the game is also known. The automatic provision of offers to purchase the online game during a trial period is also known. Conventional systems, however, suffer from various drawbacks and inefficiencies relating to providing progressive, timed offers to a player based on whether that player is a new player or an existing player that has not yet made any purchases in the online game.

SUMMARY

One aspect of the disclosure relates to providing an in-game offer to one or more players of an online game. The offer is provided to players that have newly joined the game and/or to players that have not yet made a purchase. In some implementations, the offer may be meant to incentivize purchase upon entry into the game. The in-game offer may comprise an offer to one or more items and a bonus comprising one or more bonus items provided to the player responsive to the offered items being purchased. The in-game offer may only be made available to a qualifying player for a certain amount of time.

A system configured to facilitate providing an in-game offer to one or more players of an online game may include one or more processors configured to execute compute program modules. The program modules may comprise a space module, a player selection module, an offer selection module, an offer provision module, and/or other modules.

The space module may be configured to execute an instance of a virtual space. The space module may be configured to implement the instance of the virtual space to effectuate presentation of views of the virtual space to the one or more players by one or more client computing platforms.

The player selection module may be configured to determine whether a player qualifies for an offer (e.g., whether a player is one or both of: a new player or a player that has not engaged in any purchases in the online game). For example, the player selection module may be configured to determine whether a player registered for the game within a predetermined period of time. A new player may be, for example, a player that joined the game 1 day ago, 3 days ago, 5 days ago, one week ago, and/or within another time period. A new player may also be a player that moved to another server associated with the system. For example, the player may move to another server that hosts a different space module. In another example, a new player may be a player that has not yet made a purchase in the game. The player selection module may determine, from a profile associated with a player, whether the player is a new player. The player selection module may also determine from player registrations to join the game whether a player is a new player. In some implementations, an administrator associated with the game may set the qualifications associated with being considered a new player in the game and/or the qualifications associated with receiving an offer.

The offer selection module may be configured to select a first offer from a plurality of offers as the in-game offer to provide to the player and select a first bonus from a plurality of bonuses as the first bonus to provide along with the first offer. An offer may comprise an opportunity to purchase one or more items and a bonus may comprise at least one bonus item that may be provided to the player responsive to the player purchasing the one or more offered items. In some implementations, the one or more items included in the offer may be items available for purchase by any player in the game. For example, the items may be items in a virtual marketplace or a virtual store associated with the game. In some implementations, the one or more items included in the offer may be a subset of items available for purchase in the game. For example, a new player may only receive an offer to purchase one or more items at a specific price point, geared towards a specific goal, related to a specific subject matter, and/or one or more items otherwise grouped. In some implementations, a bonus comprising one or more bonus items may be associated with a respective offer. In some implementations, a bonus may be associated with one or more specific offers, with any of the offers available, and/or with another grouping of offers. The one or more items included in the bonus may be items available in a virtual marketplace or virtual store associated with the game, items unavailable in the marketplace, a mix of unavailable and available items, and/or other items.

In some implementations, the offer selection module may provide a bonus to the player along with the provision of an offer, but may not reveal to the player the items in the bonus. In some implementations, the offer selection module may reveal one or more of: the items in the bonus, a value in the game of each item in the bonus, a value in the game of the bonus as a whole, an availability of each item in the bonus in the game, and/or other information relating to the bonus. In some implementations, the offer selection module may reveal more information relating to the bonus as a time during which the offer and bonus are made available to the player decreases.

In some implementations, the offer selection module may segment players based on one or more player parameters, and may generate a plurality of offers and a plurality of bonuses for a respective segment of players. For example, the offer selection module may obtain values of respective player parameters for the players of the game. The offer selection module may form at least a first segment of players based on a value of a first parameter. The offer selection module may generate a plurality of offers and a plurality of bonuses for the first segment. A first offer of the plurality of offers may comprise an opportunity to purchase a first set of items, where a second offer may comprise an opportunity to purchase a second set of items different from the first set. A first bonus may comprise a first set of bonus items provided to the player responsive to the player accepting the first offer, and a second bonus may comprise a second set of bonus items different from the first set of bonus items.

The offer selection may track the responses of the players of the first segment to the individual offers and bonuses provided to the respective players. In some implementations, a first subset of players of the first segment may have been provided the first offer and the first bonus, while a second subset of players of the first segment may have been provided the first offer and the second bonus. In these implementations, the offer selection module may track the responses of the one or more players of the first subset to the first offer and the first bonus and the responses of one or more players of the second subset to the first offer and the second bonus. In some of these implementations, the offer selection module may assess a relative effectiveness of the offers and bonuses transmitted to the first segment based on the responses of the players of the first segment. The assessment may include determining whether the provision of the first offer and the first bonus or the provision of the first offer and the second bonus is more effective for the first segment of players. In some implementations, the first subset may receive a first offer and a first bonus, while the second subset may receive a second offer and a second bonus.

In some implementations, the offer selection module may be configured to select a second offer and a second bonus to provide to the player responsive to the player not accepting the first offer.

The offer provision module may be configured to provide a first offer and a first bonus to a player responsive to the player selection module determining that the player qualifies for an offer (e.g., the player is one or both of: a new player or a player that has not engaged in any purchases in the online game). The offer provision module may make the offer available to the player for a specific amount of time. For example, the offer provision module may make the offer available to the player for a predetermined amount of time, for an amount of time based on one or more characteristics of the player as obtained from a profile associated with the player, for an amount of time determined based on results of split testing of time frames for making available an offer and a bonus, and/or for other periods of time. In some implementations, a combination of an offer and a bonus may be associated with a respective predetermined amount of time.

In some implementations, responsive to the player not accepting the first offer, the offer provision module may make available the plurality of available offers to the player. In some of these implementations, the offer provision module may make the offers available to the player but may not make any bonuses available to the player. In some implementations, responsive to the player not accepting the first offer, the offer provision module may provide a second offer and a second bonus to the player. The offer provision module may make the second offer and the second bonus available to the player for a predetermined amount of time, for an amount of time based on one or more characteristics of the player as obtained from a profile associated with the player, for an amount of time determined based on results of split testing time frames for making available a second offer and a second bonus, and/or for other periods of time. In some implementations, responsive to the player not accepting the first offer and not accepting the second offer, the offer provision module may make available the plurality of available offers to the player. In some of these implementations, the offer provision module may make the offers available to the player but may not make any bonuses available to the player.

In some implementations, a computer-implemented method of providing an in-game offer to one or more players of an online game may be implemented in a computer system comprising one or more physical processors. The computer-implemented method may comprise executing an instance of a virtual space; implementing the instance of the virtual space to effectuate presentation of views of the virtual space to the one or more players by the one or more client computing platforms; determining whether a player is one or both of: a new player or a player that has not engaged in any purchases in the online game; selecting a first offer from a plurality of offers as the in-game offer to provide to the player; selecting a first bonus from a plurality of bonuses as the first bonus to provide along with the first offer; and providing the first offer and the first bonus to the player responsive to the player being one or both of: a new player or a player that has not engaged in any purchases in the online game, wherein the first offer comprises an opportunity to purchase a first item and the first bonus comprises at least one first bonus item provided to the player responsive to the first offer being accepted by the player.

In some implementations a non-transitory electronic storage media may store information related to providing an in-game offer to one or more players of an online game. The stored information may comprise a memory configured to store information related to the one or more players of an online game, and instructions configured to cause a client computing platform to: execute an instance of a virtual space; implement the instance of the virtual space to effectuate presentation of views of the virtual space to the one or more players by the one or more client computing platforms; determine whether a player is one or both of: a new player or a player that has not engaged in any purchases in the online game; select a first offer from a plurality of offers as the offer to provide to the player; select a first bonus from a plurality of bonuses as the first bonus to provide along with the first offer; and provide the first offer and the first bonus to the player responsive to the player being one or both of: a new player or a player that has not engaged in any purchases in the online game, wherein the first offer comprises an opportunity to purchase a first item and the first bonus comprises at least one first bonus item provided to the player responsive to the first offer being accepted by the player.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 4 illustrates an exemplary method of providing an in-game offer to one or more players of an online game.

DETAILED DESCRIPTION

Figure 1:
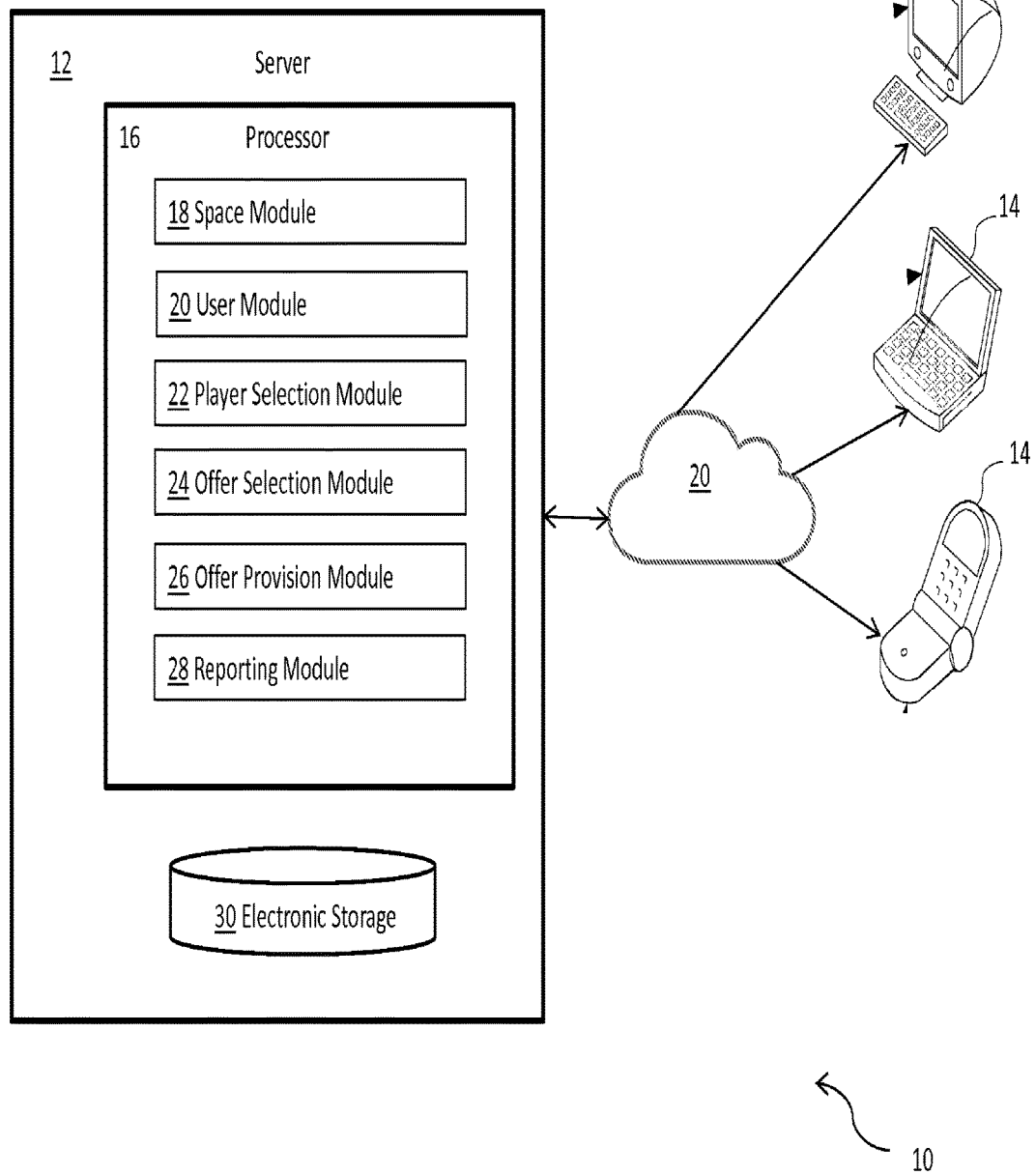
FIG. 1 illustrates an exemplary system configured to provide an in-game offer to one or more players of an online game.

FIG. 1 illustrates a system 10 configured to provide a timed, in-game offer to one or more players of an online game. System 10 may be configured to provide the virtual space to the players over a network (e.g., network 20). Providing the virtual space may include hosting the virtual space over network 20. System 10 may be configured to provide a timed, in-game offer to one or more players of an online game. The offer is provided to players that have newly joined the game and/or to players that have not yet made a purchase. In some implementations, the offer may be meant to incentivize purchase upon entry into the game. The in-game offer may comprise an offer to one or more items and a bonus comprising one or more bonus items provided to the player responsive to the offered items being purchased. The in-game offer may only be made available to a qualifying player for a certain amount of time.

In some implementations, system 10 may include a server 12. The server 12 may be configured to communicate with one or more client computing platforms 14 according to a client/server architecture. One or more players may access system 10 and/or the virtual space via client computing platforms 14.

Server 12 may be configured to execute one or more computer program modules. The computer program modules may include one or more of a space module 18, a player module 20, a player selection module 22, an offer selection module 24, an offer provision module 26, a reporting module 28, and/or other modules.

Space module 18 may be configured to implement the instance of the virtual space executed by the computer modules to facilitate participation by one or more players in a game within the virtual space by determining view information that facilitates presentation of views of the virtual space to the one or more players. The view information may then be communicated (e.g., via streaming, via object/position data, and/or other information) from server 12 to client computing platforms 14 for presentation to players. The view information determined and transmitted to a given client computing platform 14 may correspond to an entity being controlled by a player via the given client computing platform 14. The view information determined and transmitted to a given client computing platform 14 may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the player.

The instance of the virtual space may comprise a simulated space that is accessible by players via clients (e.g., client computing platforms 14) that present the views of the virtual space to a player. The simulated space may have a topography, express ongoing real-time interaction by one or more players, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which views of the virtual space are determined by space module 18 is not intended to be limiting. Space module 18 may be configured to express the virtual space in a more limited, or more rich, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space module 18, players may control entities to interact with the virtual space and/or each other. The entities may include one or more of characters, objects, simulated physical phenomena (e.g., wind, rain, earthquakes, and/or other phenomena), and/or other elements within the virtual space. Player-controlled characters may include avatars. As used herein, an entity may refer to an object (or group of objects) present in the virtual space that represents an individual player. The entity may be controlled by the player with which it is associated. The player controlled element(s) may move through and interact with the virtual space (e.g., non-player characters in the virtual space, other objects in the virtual space). The player controlled elements controlled by and/or associated with a given player may be created and/or customized by the given player. The player may have an "inventory" of virtual goods and/or currency that the player can use (e.g., by manipulation of a player character or other player controlled element, and/or other items) within the virtual space.

Control over the entities may be exercised by the players through control inputs and/or commands input through client computing platforms 14. The players may interact with each other through communications exchanged within the virtual space. Such communications may include one or more of textual chat, instant messages, private messages, voice communications, and/or other communications. Communications may be received and entered by the players via their respective client computing platforms 14. Communications may be routed to and from the appropriate players through server 12 (e.g., through space module 18).

Within the virtual space, one or more players may participate in a game. The game may include a series of tasks that are performable by the one or more players within the virtual space. The game may include tasks in which players (or their entities) are adversaries, and/or tasks in which players (or their entities) are allies. The game may include tasks in which players (or their entities) are adversaries of non-player characters, and/or tasks in which players (or their entities) are allies of non-player characters. In the game, entities controlled by the player may obtain points, virtual currency or other virtual items, experience points, levels, and/or other demarcations indicating experience and/or success. Space module 18 may be configured to perform the functions associated with the game in executing the instance of the virtual space.

Player module 20 may be configured to access and/or manage one or more player accounts associated with players of system 10. The player accounts may include player information. The one or more player accounts and/or player information may include information stored by server 12, one or more of the client computing platforms 14, storage 30, and/or other storage locations. The player accounts may include, for example, information identifying players (e.g., a playername or handle, a number, an identifier, and/or other identifying information) within the virtual space, security login information (e.g., a login code or password), virtual space account information, subscription information, virtual currency account information (e.g., related to currency held in credit for a player), relationship information (e.g., information related to relationships between players in the virtual space), virtual space usage information, award information (e.g., information related to one or more awards received by the player for completing one or more respective tasks; one or more levels of awards associated with the player; potential awards associated with the one or more levels of awards associated with the player, etc.) demographic information associated with players, interaction history among players in the virtual space, information stated by players, activity information of players, browsing history of players, a client computing platform identification associated with a player, a phone number associated with a player, player settings, and/or other information related to players. The player information may include and/or indicate an activity level of the player. The activity level may include previous login time(s), previous logout time(s), login frequency, time spent logged in, and/or other activity information. The player information may also include information related to purchases in or for the virtual space. Such information may include, for example, activity information for individual transactions, a spend rate, a total spend amount, acceptance of offers and/or bonuses provided, and/or other information related to player purchases.

As will be discussed further below, players may participate in the virtual space by controlling entities within the virtual space. The player information in the player accounts may include information related to the entities controlled by the players in the virtual space. Such information may include, for example, an entity type, an entity class, an entity identification, a level, inventory information, status information, and/or other information related to entities controlled by players in the virtual space.

Player selection module 22 may be configured to determine whether a player qualifies for an offer (e.g., whether a player is one or both of: a new player or a player that has not engaged in any purchases in the online game). For example, the player selection module 22 may be configured to determine whether a player registered for the game within a predetermined period of time. A new player may be, for example, a player that joined the game 1 day ago, 3 days ago, 5 days ago, one week ago, and/or within another time period. A new player may also be a player that moved to another server associated with the system. For example, the player may move to another server that hosts a different space module. In another example, a new player may be a player that has not yet made a purchase in the game. The player selection module 22 may determine, from a profile associated with a player, whether the player is a new player and/or whether the player has made a purchase in the game. The player selection module 22 may also determine from a record of player registrations of players that recently registered to join the game whether a player is a new player. The player selection module 22 may also determine in other ways whether a player qualifies to receive an offer. In some implementations, an administrator associated with the game may set the qualifications associated with being considered a new player in the game and/or the qualifications associated with receiving an offer.

The offer selection module 24 may be configured to select a first offer from a plurality of offers as the in-game offer to provide to the player and select a first bonus from a plurality of bonuses as the first bonus to provide along with the first offer. An offer may comprise an opportunity to purchase one or more items and a bonus may comprise at least one bonus item that may be provided to the player responsive to the player purchasing the one or more offered items.

In some implementations, the one or more items included in the offer may be items available for purchase by any player in the game. For example, the items may be items in a virtual marketplace or a virtual store associated with the game. In some implementations, the one or more items included in the offer may be a subset of items available for purchase in the game. For example, a new player may only receive an offer to purchase one or more items at a specific price point, geared towards a specific goal, related to a specific subject matter, and/or one or more items otherwise grouped. In some implementations, one or more of the one or more items may be visibly expressed in the view of the instance of the virtual space. One or more of the one or more items may provide an advantage or a utility in a game in the virtual space. One or more of the one or more items may facilitate or improve a skill of a character in the virtual space. In some implementations, the one or more items may comprise, for example, a virtual mount, a virtual pet, a virtual tool, a virtual weapon, a virtual item of clothing, a virtual portion, virtual medicine, virtual sustenance (e.g., food and/or drink), a virtual vehicle, a virtual resource, a virtual troop or group of troops, an item that speeds up or bypasses a waiting period in the virtual space, and/or other items.

In some implementations, a bonus comprising one or more bonus items may be associated with a respective offer. In some implementations, a bonus may be associated with one or more specific offers, with any of the offers available, and/or with another grouping of offers. The one or more bonus items may be items available in a virtual marketplace or virtual store associated with the game, items unavailable in the marketplace, a mix of unavailable and available items, and/or other items. In some implementations, the one or more bonus items may comprise the one or more items available to include in the offer, experience points, virtual currency, instantiation of a buff, access to an area that was not previously accessible to the player, and/or other bonus items. In some implementations, the offer selection module 24 may reveal more information relating to the bonus as a time during which the offer and bonus are made available to the player decreases.

In some implementations, the offer selection module 24 may provide a bonus to the player along with the provision of an offer, but may not reveal to the player the items in the bonus. In some implementations, the offer selection module 24 may reveal one or more of: the items in the bonus, a value in the game of each item in the bonus, a value in the game of the bonus as a whole, an availability of each item in the bonus in the game, and/or other information relating to the bonus.

In some implementations, the plurality of offers and/or the plurality of bonuses may be specific to a player, specific to a group of players that share one or more characteristics, the same for all players, and/or otherwise customized to one or more players. For example, a first player may have available a first plurality of offers and a second player may have available a second plurality of offers different from the first plurality. The numbers and types of items in each of the plurality of offers available may vary from player to player, may be the same for every player, may vary based on one or more characteristics associated with one or more players, and/or may vary in other ways as well. The numbers and types of items in each of the plurality of bonuses available may vary from player to player, may be the same for every player, may vary based on one or more characteristics associated with one or more players, and/or may vary in other ways as well. Storage 30 may store exemplary offers and bonuses available for one or more players. In some implementations, the offer selection module 24 may consult a storage (e.g., storage 30) to determine an offer and a bonus to provide to the player.

In some implementations, the offer selection module 24 may be configured to select a second offer and a second bonus to provide to the player responsive to the player not accepting the first offer. The offer selection module 24 may select a second offer and a second bonus to provide to the player in a manner the same or similar to the selection of the first offer and the first bonus. In some implementations, the offer selection module 24 may select the first offer to provide as the second offer and may select a second bonus different from the first bonus to provide along with the first offer. In some implementations, the offer selection module 24 may select a second offer different from the first offer and select the first bonus as the second bonus to provide along with the second offer. In some implementations, the second offer selected by the offer selection module 24 may be different from the first offer, and the second bonus may be different from the first bonus. In some implementations, the offer selection module 24 may consult a storage (e.g., storage 30) to determine the second offer and the second bonus to provide to the player.

In some implementations, the second offer may comprise fewer items than the first offer, may have items of lesser value than the items in the first offer, may have a purchase price that is lower than the first offer, and/or may have less value in the game than the first offer in other ways. The second bonus may comprise fewer items than the first bonus, may have items of lesser value than the items in the first bonus, and/or may have less value in the game than the first bonus in other ways. In some implementations, the second offer may comprise more items than the first offer, may have items of greater value than the items in the first offer, may have a purchase price that is higher than the first offer, and/or may have more value in the game than the first offer in other ways. The second bonus may comprise more items than the first bonus, may have items of greater value than the items in the first bonus, and/or may have more value in the game than the first bonus in other ways. In some implementations, a value of the first offer and the second offer in the game may be the same or similar, but the items and/or types of items in the first offer and the second offer may differ. A value of the first bonus and the second bonus in the game may be the same or similar, but the items and/or types of items in the first bonus and the second bonus may differ.

The offer provision module 26 may be configured to provide a first offer and a first bonus to a player responsive to the player selection module determining that the player qualifies for an offer (e.g., the player is one or both of: a new player or a player that has not engaged in any purchases in the online game). The offer provision module 26 may make the offer available to the player for a specific amount of time. For example, the offer provision module 26 may make the offer available to the player for a predetermined amount of time, for an amount of time based on one or more characteristics of the player as obtained from a profile associated with the player, and/or for other periods of time. In some implementations, a combination of an offer and a bonus may be associated with a respective predetermined amount of time. In some implementations, an amount of time to provide an offer may be determined based on results associated with split testing of a time frame in which to provide the offer.

In some implementations, responsive to the player not accepting the first offer, the offer provision module 26 may make available the plurality of available offers to the player. In some of these implementations, the offer provision module 26 may make the offers available to the player but may not make any bonuses available to the player. In some implementations, responsive to the player not accepting the first offer, the offer provision module 26 may provide a second offer and a second bonus to the player. The offer provision module 26 may make the second offer and the second bonus available to the player for a predetermined amount of time, for an amount of time based on one or more characteristics of the player as obtained from a profile associated with the player, for an amount of time determined based on results associated with split testing of a time frame in which to provide the offer and bonus, and/or for other periods of time. In some implementations, responsive to the player not accepting the first offer and not accepting the second offer, the offer provision module 26 may make available the plurality of available offers to the player. In some of these implementations, the offer provision module 26 may make the offers available to the player but may not make any bonuses available to the player.

Offer provision module 26 may provide an offer and a bonus to a player via one or more of in-game notification (e.g., a popup message in game, an icon on the player's screen, a flashing indicator, a marching icon, any combination thereof, and/or other in-game notifications), a text message (e.g., via SMS and/or other text message types), an email, a chat message, and instant messenger message, a mobile device alert, and/or other communication media. In some implementations, when offer provision module 26 provides an offer and a bonus to the player, offer provision module 26 may also provide a timer that counts down the amount of time left for the player to accept the offer and bonus. In some implementations, when one or more specified amounts of time (e.g., 1 hour, 10 minutes, 1 minute, and/or other amounts of time) are left for the player to accept the offer and bonus provided, offer provision module 26 may provide a reminder to the player. The reminder may be provided via one or more of in-game notification (e.g., a popup message in game, an icon on the player's screen, a flashing indicator, a marching icon, any combination thereof, and/or other in-game notifications), a text message (e.g., via SMS and/or other text message types), an email, a chat message, and instant messenger message, a mobile device alert, and/or other communication media. The media for providing the offer and bonus may be dictated by the offer and bonus (e.g. as one of the variables), based on a player preference or setting, based on a determination as to whether the player is logged in to the virtual space and/or the game, and/or other information.

In some implementations, offer provision module 26 may be configured to provide one or more reminders to the player after the initial provision of the offer and bonus is made. The timing and number of reminders may vary based on one or more variables include, for example, administrator settings, preferences based on the player profile, results of split testing, and/or based on other variables. A reminder may be provided in a manner the same or similar to the provision of the offer and bonus.

The reporting module 28 may be configured to provide and/or display one or more reports based on information related to the online game, information stored at storage 30, and/or other information related to system 10. For example, the reporting module 28 may be configured to facilitate analysis and report information related to system usage, player activity, award management, and/or other stored information. The reporting module 28 may be configured to produce statistics regarding the stored information and may be configured to prepare and/or display reports including one or more parts of the stored information. For example, the reporting module 28 may be configured to prepare and or display one or more reports including information related to the provision of offers and bonuses to one or more players, the time frames during which the offers and bonuses were made available, the number and types of items in a first offer made available, the number and types of items in a first bonus made available to one or more players, the numbers and types of items in a second offer made available, the numbers and types of items in a second bonus made available to one or more players, a time at which the provision of the offers and bonuses were made available, methods by which the provision of the offers and bonuses were made available, the bonuses associated with one or more offers made available to the one or more players, and/or other types of reports.

In some implementations, the reporting module 28 may be configured to display one or more reports to a player via a player interface. In some implementations, the player interface may be accessed via various channels such as, for example, a webpage, a web portal, an agent (such as a software and/or hardware module) executing on server 12, electronic mail and/or other communication channels that can be used to present the comparisons to a player. In some implementations, the system 10 may present a link to a display of one or more reports prepared by the reporting module 28.

Figure 2:
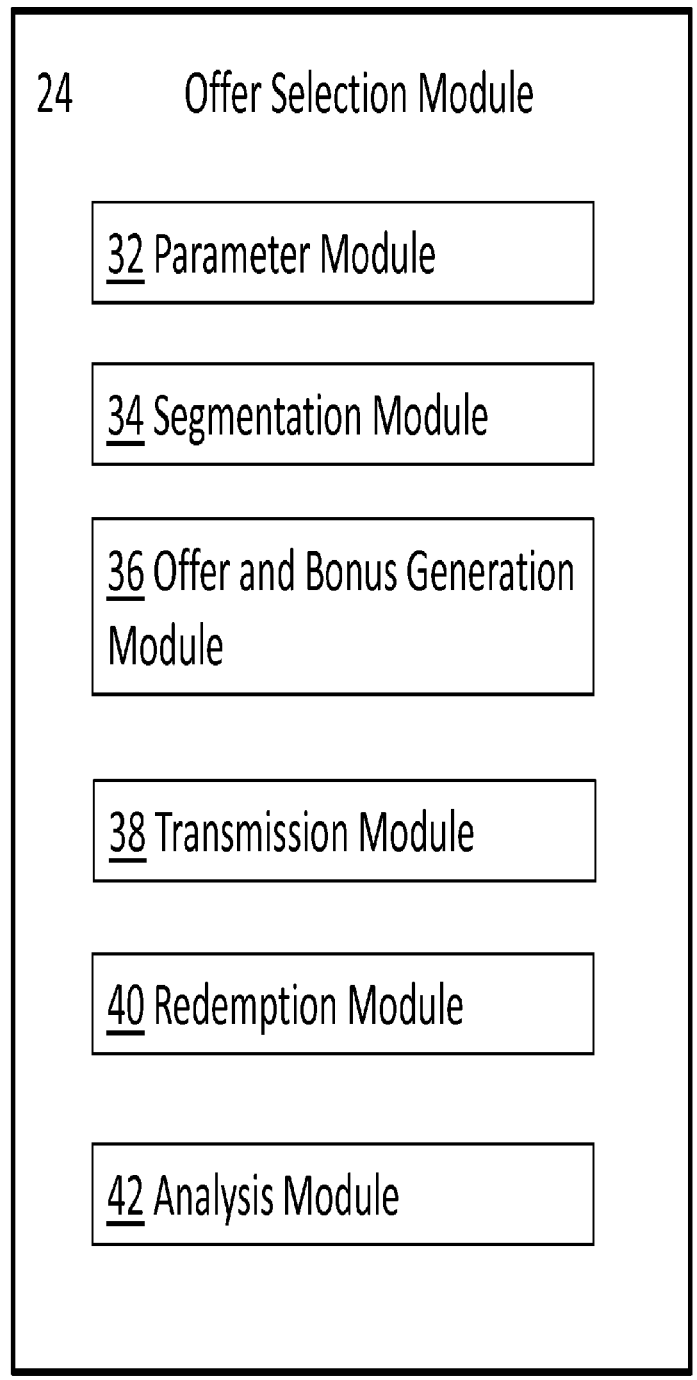
FIG. 2 illustrates an exemplary offer selection module of the system of FIG. 1.

FIG. 2 illustrates an exemplary offer selection module 24 of the system of FIG. 1. The offer selection module 24 of FIG. 2 is configured to conduct split testing comparing the provision of offers and/or bonuses to one or more players. In some implementations, the offer selection module 24 may segment players based on one or more player parameters, and may generate a plurality of offers and a plurality of bonuses for a respective segment of players. For example, the offer selection module 24 may obtain values of respective player parameters for the players of the game. The offer selection module 24 may form at least a first segment of players based on a value of a first parameter. The offer selection module 24 may generate a plurality of offers and a plurality of bonuses for the first segment. A first offer of the plurality of offers may comprise an opportunity to purchase a first set of items, where a second offer may comprise an opportunity to purchase a second set of items different from the first set. A first bonus may comprise a first set of bonus items provided to the player responsive to the player accepting the first offer, and a second bonus may comprise a second set of bonus items different from the first set of bonus items.

In some implementations, the offer selection module 24 may conduct split testing to compare the number and/or types of items to include in a first offer, a number and/or type of items to include in a second offer, a number and/or type of items to include in a first bonus, a number and/or type of items to include in a second bonus, a time at which to notify a player of an offer (e.g., based on real world time spent in the game, based on an amount of game time spent in the game, based on real world time since the last login, responsive to the player reaching a certain level in the game, response to a player performing a specific action in the game, and/or based on other factors), a time frame during which the first offer and first bonus is made available to the player, a time frame during with the second offer and second bonus is made available to the player, and/or other features of providing an in-game offer to a player.

The offer selection module 24 may track the responses of the players of the first segment to the individual offers and bonuses provided to the respective players. In some implementations, a first subset of players of the first segment may have been provided the first offer and the first bonus, while a second subset of players of the first segment may have been provided the first offer and the second bonus. In these implementations, the offer selection module 24 may track the responses of the one or more players of the first subset to the first offer and the first bonus and the responses of one or more players of the second subset to the first offer and the second bonus. In some of these implementations, the offer selection module 24 may assess a relative effectiveness of the offers and bonuses provided to the first segment based on the responses of the players of the first segment. The assessment may include determining whether the provision of the first offer and the first bonus or the provision of the first offer and the second bonus is more effective for the first segment of players. In some implementations, the first subset may receive a first offer and a first bonus, while the second subset may receive a second offer and a second bonus.

Offer selection module 24 may be configured to replace offers and/or bonuses determined to be relatively ineffective for the individual segments. For example, responsive to a determination that the first offer and first bonus is more effective for the first segment than the second offer and second bonus for the first segment, offer selection module 24 may replace the second offer and second bonus with a third offer and third bonus. This may include replacing the second offer and second bonus with a third offer and third bonus in the first set of offers and bonuses, and/or providing the third offer and third bonus as an alternative to the first offer and first bonus for the first segment. The third offer and third bonus may have been previously defined, or may be defined responsive to the determination that the first offer and first bonus is more effective for the first segment than the second offer and second bonus. In some implementations, offer selection module 24 comprises a parameter module 32, a segmentation module 34, an offer and bonus generation module 36, a redemption module 38, a tracking module 40, an analysis module 42, and/or other modules.

Parameter module 32 may be configured to obtain values for one or more player parameters. The values may be stored to the player profiles managed by player module 18. The player parameters may include one or more of a demographic parameter, a social parameter, a game parameter, an activity parameter, and/or other parameters.

A demographic parameter may include a parameter related to the real world demographics of the players. For example, a demographic parameter may include one or more of age, gender, geographic location, language, income, education level, career, marital status, and/or other demographic parameters. Parameter module 32 may be configured to obtain values of demographic parameters based on registration information provided by the player to system 10 (e.g., upon opening an account to participate in the virtual space and/or the game), information received from an online platform from which the virtual space is accessed (e.g., via a social network website, a microblogging service, and/or other online platforms), information derived or deduced from one or more other player parameters (e.g., determined from a usage parameter, from a social parameter, and/or other parameter), and/or from other information or sources.

A social parameter may include a parameter related to a social network and/or the manner and/or individuals with which a player socializes in and/or out of the virtual space. By way of non-limiting example, a social parameter may include one or more of a parameter derived from a social graph in a social network service, an in-game relationship, a social platform from which the virtual space is accessed, and/or other social parameters. Parameter module 32 may be configured to obtain values of social parameters from relationships established within the virtual space (e.g., friendships, alliances, and/or other relationships), information received from an online platform from which the virtual space is accessed, information related to the usage of the virtual space (e.g., other players with whom a first player participates in the virtual space and/or the game, other players with whom a first player communicates in the virtual space, and/or other information related to usage), and/or from other information or sources.

A game parameter may include a parameter related to participation and/or usage of the player in the game and/or the virtual space. By way of non-limiting example, a game parameter may include one or more of an entity class, an entity faction, a usage amount, one or more usage times, a level, inventory in the virtual space, a score, and/or other parameters. Parameter module 32 may be configured to obtain values of the game parameters by monitoring player interaction with the virtual space. This may include monitoring interactions of players and/or the entities they control in the instance of the virtual space executed space module 16, and/or monitoring other interactions.

An activity parameter may be related to an activity history of the player in the virtual space. By way of non-limiting example, an activity history may include one or more of activity level of the player, virtual currency account information of the player, relationship information of the player, virtual space usage information of the player, interaction history of the player, browsing history of the player, purchase history and/or other activity history. An activity parameter may also include one or more of an average participation time in a session of the player, an average time in a session after the player experiences an event, an average time between sessions of the game, a value metric representing the value of the player, an amount of time spent in the game by the player since joining the game, an amount of time since the last login of the player, an average amount of time at a level in the game, an average amount of time involved in a specific action, a spend velocity, and/or other activity parameters. An event may include, for example, joining an alliance, losing status, losing money, getting lost in the virtual game, losing a friendship, gaining a friendship, losing an alliance, receiving an offer for a virtual item, purchasing a virtual item, changing a player entity, changing a view of the game, engaging in activity with another player, entering a new level of the game, engaging in a training session, engaging in an in-game experience separate from the game, and/or other events. A purchase history may include information relating to, for example, player purchases, player sales, player exchanges, player browsing for potential virtual items for purchase, and/or other purchase events. A purchase may include a transaction in which real world currency is exchanged for one or more virtual items, a transaction in which one or more virtual items (e.g., virtual currency) is exchanged for another one or more virtual items, and/or other transactions in which one or more virtual items are received or given by a player.

Segmentation module 34 may be configured to form segments of the players on one or more of the parameters for which values are obtained by parameter module 32. For example, a first segment of players may be formed based on values of a first parameter. The first segment may include some portion of the overall players having values of the first parameter that correspond to each other. This may include values that are the same, values that are equal, values that fall within a specified range, values that are at least as adjacent as a threshold of some adjacency metric, and/or other values that correspond to each other. The use of an exemplary segment formed based on a single parameter is not intended to be limiting. The scope of this disclosure extends to implementations in which the first segment is formed on the first parameter, and on one or more other parameters.

In some implementations, segmentation module 34 may be configured to identify segments of players that have similar tendencies. For example, a segment of players may have similar activity tendencies, similar usage tendencies, similar responses to offers, similar responses to bonuses, and/or other tendencies in common.

Segmentation module 34 may identify segments of players having similar tendencies through analysis of the parameters obtained by parameter module 32, and/or from other sources.

In some implementations, segmentation module 34 may be configured to receive administrator selection of one or more values for one or more parameters. Segmentation module 34 may be configured to define a graphical player interface that is provided to an administrator player to receive entry and/or selection of such values.

Figure 3:
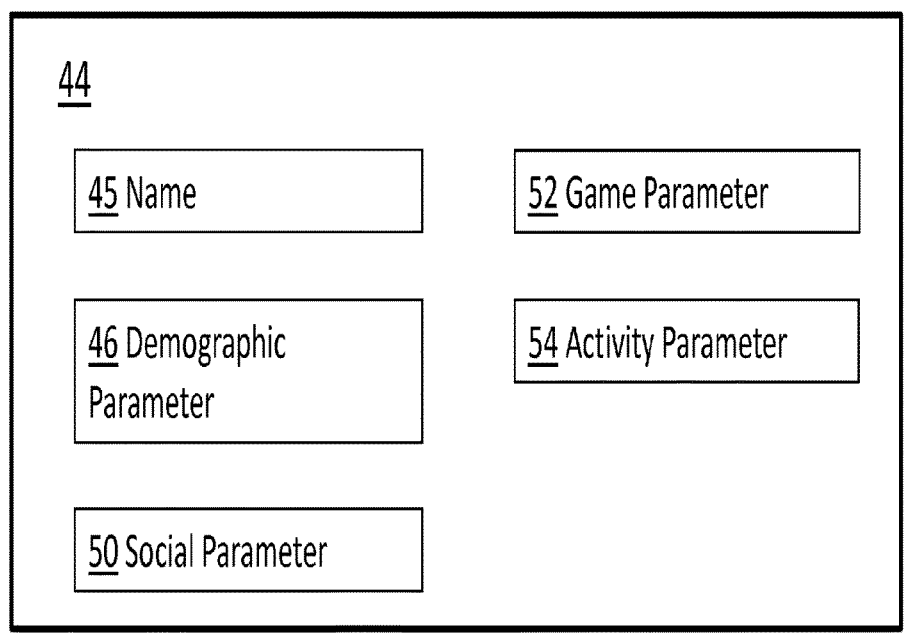
FIG. 3 illustrates a view of a graphical player interface configured to receive entry and/or selection of a definition of a player segment.

By way of illustration, FIG. 3 depicts a view 44 of a graphical player interface configured to receive entry and/or selection of a definition of a segment of players of the virtual space. View 46 may include one or more of a name field 46, a demographic parameter field 48, a social parameter field 50, a game parameter field 52, an activity parameter field 54, and/or other fields. Name field 46 may be configured to receive entry and/or selection of a name for a player segment being defined by the administrator. Demographic parameter field 48 may be configured to receive entry and/or selection of one or more demographic parameters that should be used to form the player segment. Through demographic parameter field 48, the administrator may enter and/or select parameter value(s) for the entered and/or selected one or more demographic parameters. The entered and/or selected parameter value(s) may be implemented to determine whether the individual players should be included in the player segment. The entered and/or selected parameter value(s) may specify a value that players should have to included and/or excluded from the segment, a range to determine whether players should be included and/or excluded, and/or may specify inclusion or exclusion in other ways. Social parameter field 50 may be configured to receive entry and/or selection of one or more social parameters that should be used to form the player segment. Through social parameter field 50, the administrator may enter and/or select parameter value(s) for the entered and/or selected one or more social parameters. Game parameter field 52 may be configured to receive entry and/or selection of one or more game parameters that should be used to form the player segment. Through game parameter field 52, the administrator may enter and/or select parameter value(s) for the entered and/or selected one or more game parameters. Activity parameter field 54 may be configured to receive entry and/or selection of one or more activity parameters that should be used to form the player segment. Through activity parameter field 54, the administrator may enter and/or select parameter value(s) for the entered and/or selected one or more activity parameters.

Returning to FIG. 2, offer selection module 24 may be configured to generate one or more sets of offers and bonuses for respective one or more segments of the players. This may include a set of offers and bonuses for the first player segment that includes at least a first offer and a first bonus and a second offer and a second bonus. The offer selection module 24 may be configured to generate one or more offers and one or more bonuses for an individual player based on player parameters. The individual player parameters may be player parameters accessed by segmentation module 34, player parameters associated with the individual player, and/or other individual player parameters.

The offers within a set of offers may differ by one or more variables. The variables of an offer may include one or more of the items included, a purchase price of the one or more items included, the types of items included, the timing by which the items (when purchased) may be made available to the player, the method of the provision, and/or other variables. The bonuses within a set of bonuses may differ by one or more variables. The variables of a bonus may include one or more of the items included, a value of the one or more items included (e.g., a purchase price if the player is able to purchase the item), the types of items included, the timing by which the items may be made available to the player, the method of the provision, and/or other variables.

Offer selection module 24 may be configured to vary the variables in between offers and bonuses in the sets of offers and bonuses to perform split testing on the segments of players. The determination of the values of the variables in the individual offers and bonuses (e.g., one or more of the variables to be varied between the offer and bonus made available to the player) may be performed manually (e.g., through a graphical player interface defined by offer selection module 24) by one or more administrators, may be made automatically, and/or may be made in other ways. Any technique for determining differences between offers and/or bonuses as part of split testing may be implemented without departing from the scope of this disclosure. Offer selection module 24 may also be configured to vary the variables in between offers and bonuses in the sets of offers and bonuses to an individual player based on player parameters for the individual player, player information for the individual player, and/or other player data.

Redemption module 38 may be configured to accept offers and bonuses provided by offer provision module 26 and accepted by the player to whom the offer and bonus was transmitted. This may include adding the items in the offer and bonus in a virtual inventory of the player, deducting a specific amount of virtual currency from an account of the player, taking consideration for the purchase of the item from the player, and/or other redemptions. In some implementations, redemption module 38 may facilitate the sharing or transfer, by the player, of the offer, the bonus, portions of the offer, portions of the bonus, and/or other parts of the offer and bonus. In some implementations, responsive to the player accepting an offer and a bonus, the redemption module 38 may also be configured to transmit a congratulatory message and/or other indication of redemption to the player.

Tracking module 40 may be configured to track the responses of players to the individual offers and bonuses generated by offer selection module 24. This may include determining a time spent viewing an offer and bonus, determining whether a player viewed an offer and bonus, determining a time spent viewing a reminder related to an offer and bonus, determining a time spent looking at other items available to the player during a time period in which the offer and bonus were made available to the player, determining whether a player accepted an offer and bonus, determining how quickly a player accepted an offer and a bonus, determining how many offers and bonuses were provided to the player before the player accepted an offer and a bonus, and/or other tracking activities. By way of example, responsive to the provision of the first offer and a first bonus to a first subset of players in the first segment, and to the provision of the second offer and the second bonus to a second subset of players in the first segment, tracking module 40 may track the responses of the first subset of players to the first offer and the first bonus and/or may track the responses of the second subset of players to the second offer and the second bonus.

Analysis module 42 may be configured to assess the relative effectiveness of offers and bonuses transmitted to the segments of players based on the responses of the players. This may include determining, for individual sets of offers and bonuses, a most effective offer and bonus combination in a set of offers and bonuses, a least effective offer and bonus in a set of offers and bonuses, a relative ranking of offers and bonuses in a set of offers and bonuses, and/or other determinations related to the relative effectiveness of the offers and bonuses in an individual set of offers and bonuses. Such determinations may be made based on the responses of the players as tracked by tracking module 40. The determination that the first offer and the first bonus is more effective than the second offer and second bonus may be made responsive to some threshold number of provisions of the first offer and the first bonus and/or the second offer and second bonus (alone or combined) being made, a level of difference in effectiveness between the first offer and the first bonus and the second offer and second bonus breaching a threshold, a level of effectiveness of the second offer and second bonus falling below a threshold level, and/or other events.

Analysis module 42 may be configured to determine whether first offer and the first bonus or the second offer and second bonus is more effective for the first segment of players based on the responses of the players in the first segment to the first offer and the first bonus and the second offer and second bonus. For example, analysis module 42 may be configured to assess the relative effectiveness of a given offer and bonus as a function of a number of players that accept the offer and bonus. In another example, analysis module 42 may be configured to assess the relative effectiveness of a given offer and bonus as a function of a number of players that make another purchase in the game after accepting the offer and bonus. Analysis module 42 may also be configured to assess the relative effectiveness of a given offer and bonus as a function of retention of players that accept the offer and the bonus. Retention of players may be quantified, for example, as an average retention time of players that accept the offer and bonus, as a number of players that are retained for a threshold amount of time, a number of players that spend a threshold amount of money in the game, an average revenue per player, and/or other quantifiers. Analysis module 42 may also be configured to assess the relative effectiveness of a given offer and bonus as a function of an average amount of participation by players in the game within a given amount of time after the provision of the offer and bonus. In another example, analysis module 42 may also be configured to assess the relative effectiveness of a given offer and bonus as a function of an average amount of time from the the provision of the offer and bonus to redemption by players in the game. Time may be time in the game or real world time.

Server 12 and/or client computing platforms 14 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server 12 and/or client computing platforms 14 may be operatively linked via some other communication media.

A given client computing platform 14 may include one or more processors configured to execute computer program modules. The computer program modules may be configured to enable an expert or player associated with the given client computing platform 14 to interface with server 12, and/or provide other functionality attributed herein to client computing platforms 14. By way of non-limiting example, the given client computing platform 14 may include one or more of a desktop computer, a laptop computer, a handheld computer, a tablet computing platform, a NetBook, a Smartphone, a gaming console, and/or other computing platforms.

Server 12 may include electronic storage 30, one or more processors 16, and/or other components. Server 12 may include communication lines, or ports to enable the exchange of information with a network and/or other computing platforms. Illustration of server 12 in FIG. 1 is not intended to be limiting. Server 12 may include a plurality of hardware, software, and/or firmware components operating together to provide the functionality attributed herein to server 12. For example, server 12 may be implemented by a cloud of computing platforms operating together as server 12.

Electronic storage 30 may comprise electronic storage media that electronically stores information non-transiently. The electronic storage media of electronic storage 30 may include one or both of system storage that is provided integrally (i.e., substantially non-removable) with server 12 and/or removable storage that is removably connectable to server 12 via, for example, a port (e.g., a USB port, a firewire port, etc.) or a drive (e.g., a disk drive, etc.). Electronic storage 30 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 30 may include one or more virtual storage resources (e.g., cloud storage, a virtual private network, and/or other virtual storage resources). Electronic storage 30 may store software algorithms, information determined by processor 16, information received from server 12, information received from client computing platforms 14, and/or other information that enables server 12 to function as described herein.

Processor(s) 16 may provide information processing capabilities within server 12. As such, processor 16 may include one or more of a digital processor, an analog processor, a digital circuit designed to process information, an analog circuit designed to process information, a state machine, and/or other mechanisms for electronically processing information. Although processor 16 is shown in FIG. 1 as a single entity, this is not intended to be limiting, as processor 16 may include a plurality of processors operating in coordination or cooperation. This may include implementations in which server 72 includes a multi-processor device, a farm of server devices operating together, and/or virtual resources provided by the cloud. The processor 16 may be configured to execute modules 18, 20, 22, 24, 26, and/or 28. Processor 16 may be configured to execute modules 16, 18, 20, 22, 24, 26, and/or 28 by software; hardware; firmware; some combination of software, hardware, and/or firmware; and/or other mechanisms for configuring processing capabilities on processor 16.

It should be appreciated that although modules 16, 18, 20, 22, 24, 26, and/or 28 are illustrated in FIG. 1 as being co-located within a single processing unit, in implementations in which processor 16 includes multiple processing units, one or more of modules 16, 18, 20, 22, 24, 26, and/or 28 may be located remotely from the other modules. The description of the functionality provided by the different modules 16, 18, 20, 22, 24, 26, and/or 28 described below is for illustrative purposes, and is not intended to be limiting, as any of modules 16, 18, 20, 22, 24, 26, and/or 28 may provide more or less functionality than is described. For example, one or more of modules 16, 18, 20, 22, 24, 26, and/or 28 may be eliminated, and some or all of its functionality may be provided by other ones of modules 16, 18, 20, 22, 24, 26, and/or 28. As another example, processor 16 may be configured to execute one or more additional modules that may perform some or all of the functionality attributed below to one of modules 16, 18, 20, 22, 24, 26, and/or 28.

FIG. 4 illustrates a method 56 of providing an in-game offer to one or more players of an online game. The operations of method 56 presented below are intended to be illustrative. In some implementations, method 56 may be accomplished with one or more additional operations not described, and/or without one or more of the operations discussed. Additionally, the order in which the operations of method 56 are illustrated in FIG. 4 and described below is not intended to be limiting.

In some implementations, method 56 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 56 in response to instructions stored electronically on an electronic storage medium. The one or more processing devices may include one or more devices configured through hardware, firmware, and/or software to be specifically designed for execution of one or more of the operations of method 56.

At an operation 58, an instance of a virtual space may be executed. In some implementations, operation 58 may be performed by a space module the same as or similar to space module 18 (shown in FIG. 1 and described above).

At an operation 60, the executed instance of the virtual space may be implemented to determine view information. The view information may define views to be presented to players via client computing platforms. In some implementations, operation 60 may be performed by a space module the same as or similar to space module 18 (shown in FIG. 1 and described above).

At an operation 62, a determination of whether a player qualifies to receive an offer (e.g., whether the player is a new player, has not yet made a purchase in the game, and/or qualifies in some other way for the offer). In some implementations, operation 62 may be performed by a player selection module the same as or similar to player selection module 22 (shown in FIG. 1 and described above).

At an operation 64, an offer may be selected to provide to a qualifying player. In some implementations, operation 64 may be performed by an offer selection module 24 the same as or similar to offer selection module 24 (shown in FIG. 1 and described above).

At an operation 66, a bonus may be selected to provide to a qualifying player along with the offer. In some implementations, operation 66 may be performed by an offer selection module 24 the same as or similar to offer selection module 24 (shown in FIG. 1 and described above).

At an operation 68, the offer and the bonus may be provided to the player responsive to the player qualifying for the offer (as determined at operation 64). In some implementations, operation 68 may be performed by an offer provision module 26 the same as or similar to offer provision module 26 (shown in FIG. 1 and described above).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A computer-implemented method of providing in-game offers to users of a virtual space, the method being implemented in a computer system comprising one or more physical processors, the method comprising:
   executing an instance of a virtual space;
   implementing the instance of the virtual space to effectuate presentation of views of the virtual space to the users by one or more client computing platforms;
   managing user accounts for the users, wherein individual user accounts include information about individual users, wherein the information about an individual user includes user-specific registration information regarding a moment the individual user registered to join the virtual space, wherein the users include a first user, and a second user;
   differentiating between users that are not new to the virtual space and have not engaged in purchases in the virtual space, and users that are not new to the virtual space and have engaged in purchases in the virtual space, wherein differentiation whether the individual user is new to the virtual space is based on the user-specific registration information, and wherein differentiation of the first user and the second user is performed such that:
      the first user is identified as not new to the virtual space and having not engaged in purchases in the virtual space, and
      the second user is identified as not new to the virtual space and having engaged in purchases in the virtual space;
   selecting one or more offers from multiple offers as the in-game offers to provide to the users;
   selecting one or more bonuses from multiple bonuses to provide along with the selected one or more offers; and
   providing the one or more offers and the one or more bonuses to individual ones of the users responsive to any of the individual ones of the users being not new to the virtual space and having not engaged in any purchases in the virtual space so that individual users are excluded from receiving the one or more offers and the one or more bonuses responsive to the individual users being not new to the virtual space and having engaged in any purchases in the virtual space, such that the one or more offers are provided to the first user and are not provided to the second user, the one or more offers including a first offer provided to the first user, and
   wherein the one or more provided offers comprise an opportunity to purchase a first item and the one or more provided bonuses comprise at least one first bonus item provided to the individual ones of the users responsive to the one or more provided offers being accepted by the individual ones of the users.

2. The method of claim 1, wherein providing the one or more offers to the individual ones of the users comprises:
   providing the one or more offers to the individual ones of the users during a first time period.

3. The method of claim 2, wherein the first time period is a predetermined time period.

4. The method of claim 2, wherein the first time period is based on one or more characteristics of the individual ones of the users.

5. The method of claim 1, wherein, responsive to a particular user from the individual ones of the users not accepting the provided offer:
   selecting an alternative offer from the multiple offers;
   selecting an alternative bonus from the multiple bonuses; and
   providing the alternative offer and the alternative bonus to the particular user, wherein the alternative offer comprises an opportunity to purchase a second item and the alternative bonus comprises at least one second bonus item provided to the particular user responsive to the alternative offer being accepted by the particular user.

6. The method of claim 5, wherein providing the alternative offer comprises providing the alternative offer for a second obtained time period.

7. The method of claim 5, wherein responsive to the individual ones of the users not accepting the provided offer and not accepting the alternative offer, making available the multiple offers to the second user.

8. The method of claim 1, wherein responsive to the individual ones of the users not accepting the provided offers, making available the multiple offers to the second user.

9. The method of claim 1, wherein selecting the one or more offers comprises:

obtaining values of respective user parameters for the users, the respective user parameters comprising at least a first parameter;

forming at least a first segment of users from the users based on a value of the first parameter; and generating the multiple offers and the multiple bonuses for the first segment, the multiple offers including at least the first offer and a second offer, the multiple bonuses including at least the first bonus and a second bonus, wherein the second offer comprises the opportunity to purchase a second item that is different from the first item, and wherein the second bonus comprises at least one second bonus item provided to the first user responsive to the second offer being accepted.

10. The method of claim 9, further comprising:

tracking responses of the users of the first segment to an individual offer and bonus provided, the tracking including, responsive to the provision of the first offer and the first bonus to a first subset of users of the first segment and the provision of the first offer and the second bonus to a second subset of users of the first segment, tracking the responses of one or more users of the first subset to the first offer and the first bonus and tracking the responses of one or more users of the second subset to the first offer and the second bonus; and assessing a relative effectiveness of offers and bonuses transmitted to the first segment based on the responses of the users of the first segment, the assessing including determining whether the provision of the first offer and the first bonus or the provision of the first offer and the second bonus is more effective for the first segment of users.

11. The method of claim 9, further comprising:

tracking responses of the users of the first segment to the individual offer and bonus provided, the tracking including, responsive to the provision of the first offer and the first bonus to a first subset of users of the first segment and the provision of the second offer and the second bonus to a second subset of users of the first segment, tracking the responses of one or more users of the first subset to the first offer and the first bonus and tracking the responses of one or more users of the second subset to the second offer and the second bonus; and assessing a relative effectiveness of offers and bonuses transmitted to the first segment based on the responses of the users of the first segment, the assessing including determining whether the provision of the first offer and the first bonus or the provision of the second offer and the second bonus is more effective for the first segment of users.

12. A system configured to facilitate providing in-game offers to users of a virtual space, the system comprising:

one or more processors configured by machine-readable instructions to:

execute an instance of a virtual space, and to implement the instance of the virtual space to effectuate presentation of views of the virtual space to the users by one or more client computing platforms;

manage user accounts for the users, wherein individual user accounts include information about individual users, wherein the information about an individual user includes user-specific registration information regarding a moment the individual user registered to join the virtual space, wherein the users include a first user and a second user;

differentiate between users that are not new to the virtual space and have not engaged in purchases in the virtual space, and users that are not new to the virtual space and have engaged in purchases in the virtual space, wherein differentiation whether the individual user is new to the virtual space is based on the user-specific registration information, and wherein differentiation of the first user and the second user is performed such that:

the first user is identified as not new to the virtual space and having not engaged in purchases in the virtual space, and the second user is identified as not new to the virtual space and having engaged in purchases in the virtual space;

select one or more offers from multiple offers as the in-game offers to provide to the users;

select one or more bonuses from multiple bonuses to provide along with the selected one or more offers; and provide the one or more offers and the one or more bonuses to individual ones of the users responsive to any of the individual ones of the users being not new to the virtual space and having not engaged in any purchases in the virtual space so that individual users are excluded from receiving the one or more offers and the one or more bonuses responsive to the individual users being not new to the virtual space and having engaged in any purchases in the virtual space, such that the one or more offers are provided to the first user and not to the second user, the one or more offers including a first offer provided to the first user, and no offer that is the same as the first offer is provided to the second user, and wherein the one or more provided offers comprises an opportunity to purchase a first item and the one or more provided bonuses comprise at least one first bonus item provided to the individual ones of the users responsive to the provided offer being accepted by the individual ones of the users.

13. The system of claim 12, wherein the one or more processors are configured by machine-readable instructions to provide the one or more offers to the individual ones of the users for a first time period.

14. The system of claim 13, wherein the first time period is a predetermined time period.

15. The system of claim 13, wherein the first time period is based on one or more characteristics of the individual ones of the users.

16. The system of claim 12, wherein, the one or more processors are configured by machine-readable instructions to select, responsive to a particular user from the individual ones of the users not accepting the offer, an alternative offer from the multiple offers and select an alternative bonus from the multiple bonuses; and provide the alternative offer and the alternative bonus to the particular user, wherein the alternative offer comprises an opportunity to purchase a second item and the alternative bonus comprises at least one alternative bonus item provided to the particular user responsive to the alternative offer being accepted by the particular user.

17. The system of claim 16, wherein the one or more processors are configured by machine-readable instructions to provide the alternative offer and the alternative bonus for a second time period, the second time period beginning after the first time period.

18. The system of claim 17, wherein responsive to the individual ones of the users not accepting the provided offer and not accepting the alternative offer, the one or more processors are configured by machine-readable instructions to make available the multiple offers to the second user.

19. The system of claim 12, wherein responsive to the individual ones of the users not accepting the provided offer, the one or more processors are configured by machine-readable instructions to make available the multiple offers to the second user.

20. The system of claim 12, wherein the one or more processors are configured by machine-readable instructions to:
   obtain values of respective user parameters for the users, the respective user parameters comprising at least a first parameter;
   form at least a first segment of users from the users based on a value of the first parameter; and
   generate the multiple offers and the multiple bonuses for the first segment, the multiple offers including at least the first offer and a second offer, the multiple bonuses including at least the first bonus and a second bonus, wherein the second offer comprises the opportunity to purchase a second item that is different from the first item, and wherein the second bonus comprises at least one second bonus item provided to the first user responsive to the second offer being accepted.

21. The system of claim 20, wherein the one or more processors are configured by machine-readable instructions to:
   track responses of the users of the first segment to an individual offer and bonus provided, the tracking including, responsive to the provision of the first offer and the first bonus to a first subset of users of the first segment and the provision of the first offer and the second bonus to a second subset of users of the first segment, tracking the responses of one or more users of the first subset to the first offer and the first bonus and tracking the responses of one or more users of the second subset to the first offer and the second bonus; and
   assess a relative effectiveness of offers and bonuses transmitted to the first segment based on the responses of the users of the first segment, the assessing including determining whether the provision of the first offer and the first bonus or the provision of the first offer and the second bonus is more effective for the first segment of users.

22. The system of claim 20, wherein the one or more processors are configured by machine-readable instructions to:
   track responses of the users of the first segment to the individual offer and bonus provided, the tracking including, responsive to the provision of the first offer and the first bonus to a first subset of users of the first segment and the provision of the second offer and the second bonus to a second subset of users of the first segment, tracking the responses of one or more users of the first subset to the first offer and the first bonus and tracking the responses of one or more users of the second subset to the second offer and the second bonus; and
   assess a relative effectiveness of offers and bonuses transmitted to the first segment based on the responses of the users of the first segment, the assessing including determining whether the provision of the first offer and the first bonus or the provision of the second offer and the second bonus is more effective for the first segment of users.

\* \* \* \* \*